R. J. BOLTZ.
TOBACCO STEMMING MACHINE.
APPLICATION FILED AUG. 6, 1913.

1,100,948.

Patented June 23, 1914.
2 SHEETS—SHEET 2.

WITNESSES:

INVENTOR
Robert J. Boltz,
BY
Chas. N. Butler
ATTORNEY.

UNITED STATES PATENT OFFICE.

ROBERT J. BOLTZ, OF PHILADELPHIA, PENNSYLVANIA.

TOBACCO-STEMMING MACHINE.

1,100,948. Specification of Letters Patent. Patented June 23, 1914.

Application filed August 6, 1913. Serial No. 783,234.

*To all whom it may concern:*

Be it known that I, ROBERT J. BOLTZ, a citizen of the United States, residing in the city of Philadelphia, county of Philadelphia, and State of Pennsylvania, have invented a Tobacco-Stemming Machine, of which the following is a specification.

My invention is an improved machine designed primarily for cutting out the butts or the desired parts of the stems from Habana or other leaf tobacco of the finer and smaller grades, particularly where it is not desired to remove the entire stem as is commonly required in preparing the leaves of the coarser grades of tobacco for the manufacture of cigars.

The characteristic advantages are due to the ability to shear from the leaf the desired amount of the stem, depending upon the character of the leaf, by a simple, safe and efficient machine, permitting desired flexibility in operation and saving waste.

In its preferred form, my invention is embodied in a machine comprising a die or cutting block having therein a tapered slot forming stationary shearing means with angularly disposed cutting edges, in combination with reciprocating resilient shearing means conforming to such slot and having angularly disposed cutting edges coacting with the edges of the stationary shearing means, means for guiding butts and means for protecting the operator.

Figure 1:
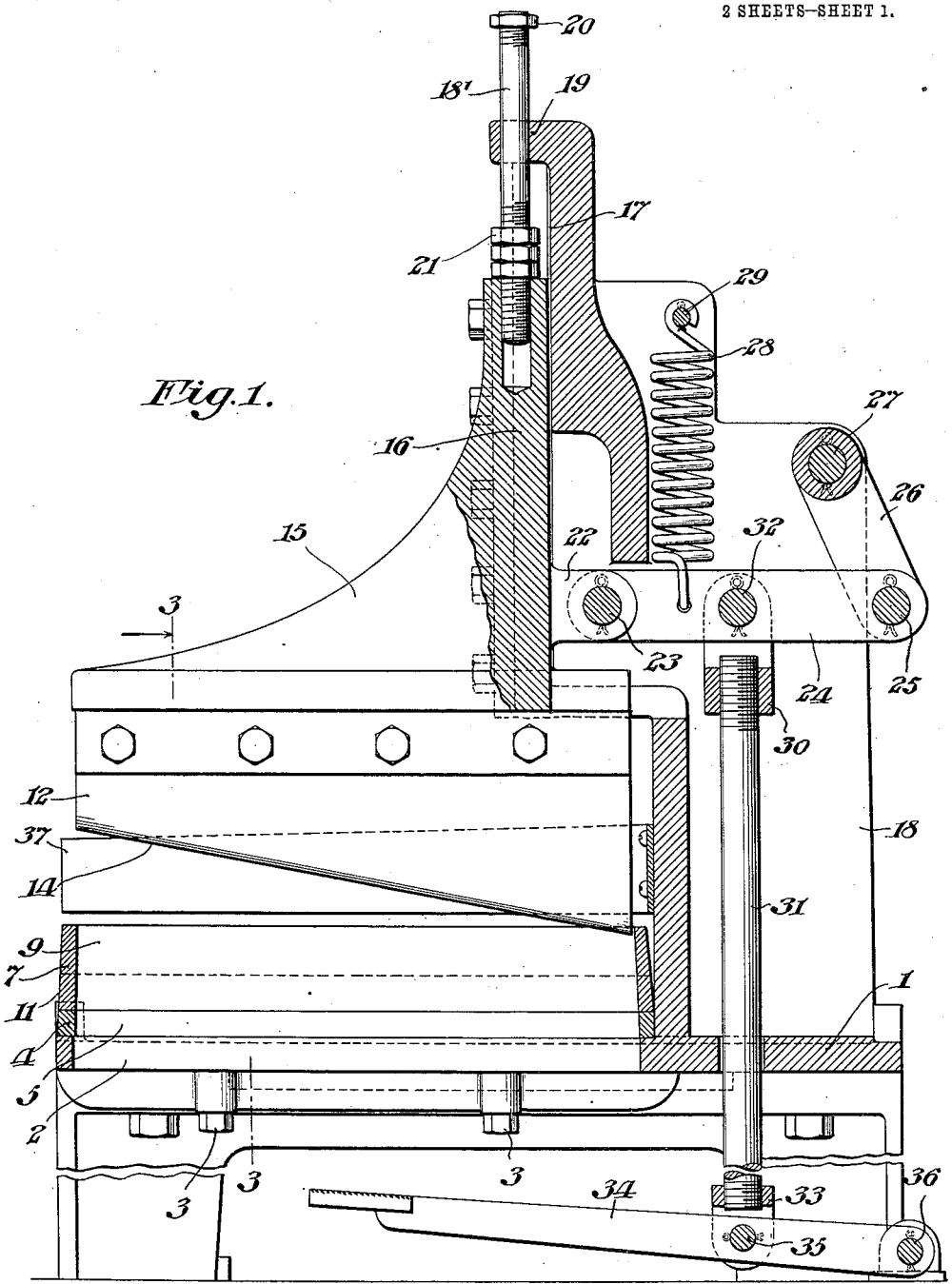
Figure 2:
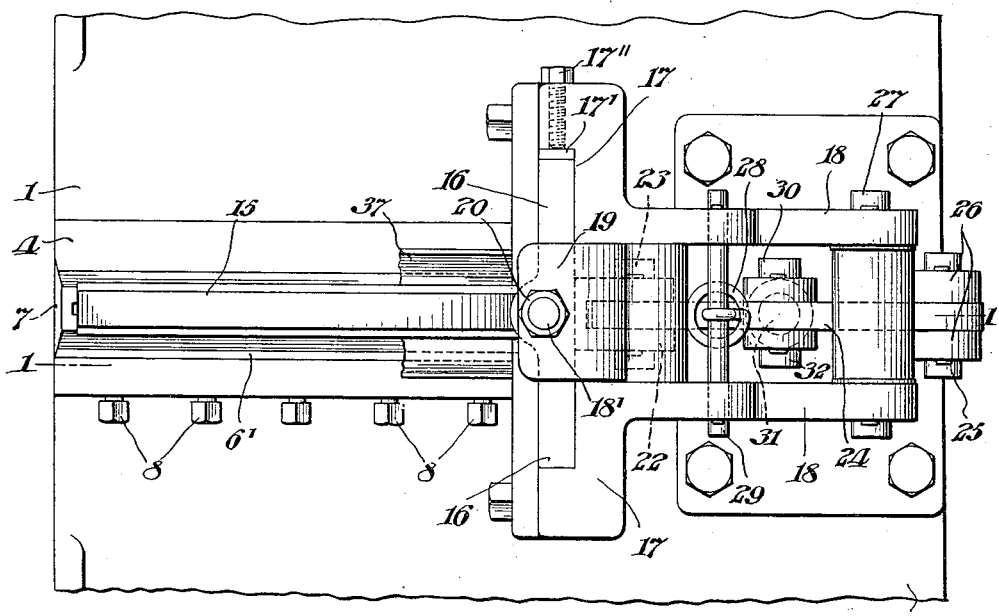
Figure 4:
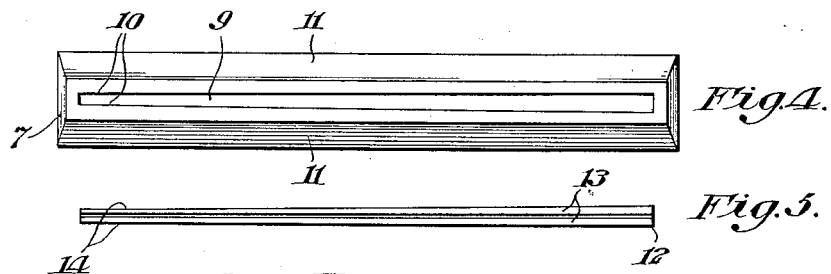
Figure 5:
Figure 3:
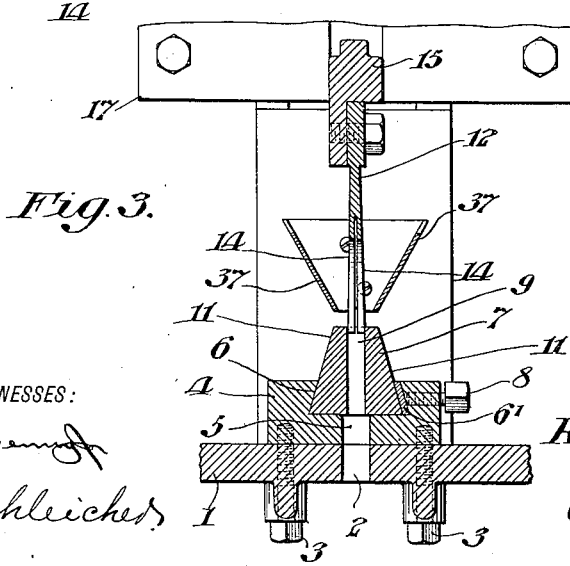

In the drawings, Figure 1 is a broken sectional elevation, on the line 1—1 of Fig. 2, of a machine embodying my invention; Fig. 2 is a broken top plan view of the same; Fig. 3 is a sectional view on the line 3—3 of Fig. 1; Fig. 4 is a top plan view of the cutting block; and Fig. 5 is a bottom plan view of the shearing means which reciprocate in the block.

The machine comprises a table 1, containing a slot 2, on which is fixed, by bolts 3, a bed plate or block 4 containing a slot 5 registering with the slot 2 and a dovetail way 6 above the slots.

A die or shearing block 7, of dovetail cross-section, is fixed in the way 6 by a set screw 8 and contains a tapered slot 9 registering with the slot 5 and forming the angularly disposed shearing edges 10, the die's inclined sides 11 providing supports, guides and protection for the hands of the operator.

A split tapered knife 12, having the resilient blades 13 with angularly disposed inclined shearing edges 14, fits the slot 9, the cutting edges 10 whereof coact in shearing relation with the cutting edges 14.

The knife 12 is bolted to a head 15 having thereon a vertical slide 16 which is movable in a vertical way 17 of bearings 18 fixed on the table 1, the slide 16 having thereon a rod 18' which reciprocates in the bearing 19 at the top of the way 17 and the rod being provided with the adjustable nuts 20 and 21 to engage the bearing to limit the movement of reciprocation.

The head 15 is provided with a bearing 22 which is pivotally connected, by a pin 23, with a lever 24 which is fulcrumed on a pin 25 carried by links 26, the latter being journaled on a pin 27 supported by the bearings 18. A coiled spring 28 has its top fixed to a pin 29 carried by the bearings 18 and its bottom fixed to the lever 24 which is normally elevated thereby and elevates the head 15 with the knife 12 thereon. A yoke 30 on a rod 31 is fixed to the lever 24 by a pin 32 and a yoke 33 on this rod is connected to the pedal or foot lever 34 by a pin 35, the lever being fulcrumed on the pin 36 and acting to depress the head 15 with the knife 12 thereon against the action of the spring 28.

The knife blades 13 reciprocate between guiding and guarding devices 37, diverging upwardly and extending so close to the top of the die 7 that the operator's fingers cannot pass under the knife.

In operation, with the knife elevated, the tobacco leaf is placed upon the die, with the stem in registration with the slot 9, the leaf being adjusted so that the front part of the descending knife will divide the stem at the desired part at the end of the shearing operation by which the butt, or part of the stem to be removed, has been cut out close to its edges, the contraction of the slot and blade from the rear to the front corresponding to the taper of the tobacco stem to be removed. If, as is frequently the case, the end of the stem in the leaf is curled, this curled end is entered between the parts 37 and carried to the desired position for shearing it out by the descent of the knife. As the knife reciprocates in the slot, the resiliency of the blades holds them in close frictional engagement with the die and keeps the cutting edges sharp, whereby clean shearing is effected.

Having described my invention, I claim:

1. In apparatus of the character described, shearing mechanism comprising a plurality of converging edges, in combination with reciprocating shearing mechanism comprising converging edges coacting with the edges of said first named mechanism.

2. In apparatus of the character described, shearing mechanism comprising a die containing a slot, in combination with shearing mechanism comprising resilient blades adapted to reciprocate in said slot, and means for reciprocating said mechanism last named.

3. In apparatus of the character described, a stationary shearing mechanism having therein a tapered slot forming converging cutting edges, in combination with shearing mechanism comprising resilient blades adapted to reciprocate in said slot and coact with said edges, said blades having inclined edges, and means for reciprocating said second named shearing mechanism.

4. In apparatus of the character described, a cutting block having a slot therein, in combination with a knife having resilient blades in said slot in frictional engagement with said block, the edges of said blades being disposed obliquely to the surface of said block.

5. In apparatus of the character described, an apertured die having sides below the top thereof and adapted for guiding the hands of the operator, in combination with shearing means having inclined edges movable in said die, and mechanism for reciprocating said means.

6. In apparatus of the class described, a cutting block containing a slot having converging edges, in combination with a knife reciprocating in said slot and having edges conforming to edges thereof, the edges of said knife being disposed obliquely to a horizontal plane.

7. In apparatus of the class described, a die containing a slot having converging edges, a knife adapted to reciprocate in said slot and having edges conforming to the edges thereof, a head to which said knife is fixed, said head having a slide at one end thereof, and a way in which said slide reciprocates, the end of said knife opposite said slide being free.

In testimony whereof I have hereunto set my hand this 23rd day of July, 1913, in the presence of the subscribing witnesses.

ROBERT J. BOLTZ.

Witnesses:
Jos. G. DENNY, Jr.,
C. N. BUTLER.

---

Copies of this patent may be obtained for five cents each, by addressing the "Commissioner of Patents, Washington, D. C."